United States Patent
Bruneau et al.

(10) Patent No.: US 10,999,091 B2
(45) Date of Patent: May 4, 2021

(54) SYSTEM FOR THE CONTROL OF CONNECTED THINGS, CORRESPONDING METHOD OF CONTROL AND COMPUTER PROGRAM

(71) Applicant: Orange, Paris (FR)

(72) Inventors: Garry Bruneau, Chatillon (FR); Philippe Quesson, Chatillon (FR)

(73) Assignee: ORANGE, Paris (FR)

( * ) Notice: Subject to any disclaimer, the term of this patent is extended or adjusted under 35 U.S.C. 154(b) by 40 days.

(21) Appl. No.: 16/456,560

(22) Filed: Jun. 28, 2019

(65) Prior Publication Data

US 2020/0007355 A1    Jan. 2, 2020

(30) Foreign Application Priority Data

Jun. 29, 2018   (FR) .................................. FR1855924

(51) Int. Cl.
*H04L 12/28* (2006.01)
*H05B 47/19* (2020.01)

(52) U.S. Cl.
CPC ......... *H04L 12/2818* (2013.01); *H05B 47/19* (2020.01); *H04L 2012/285* (2013.01); *H04L 2012/2841* (2013.01)

(58) Field of Classification Search
None
See application file for complete search history.

(56) References Cited

U.S. PATENT DOCUMENTS

| | | | |
|---|---|---|---|
| 2010/0134051 A1* | 6/2010 | Huizenga | H05B 47/19 315/362 |
| 2014/0164621 A1 | 6/2014 | Nakama | |
| 2016/0255702 A1* | 9/2016 | Thompson | H01H 9/161 315/133 |
| 2018/0048479 A1* | 2/2018 | Lin | H04N 21/43615 |
| 2018/0190451 A1* | 7/2018 | Scruggs | H01H 23/145 |

FOREIGN PATENT DOCUMENTS

| | | | |
|---|---|---|---|
| CN | 104023429 A | 9/2014 | |
| CN | 204131228 U | 1/2015 | |
| WO | 2012168868 A1 | 12/2012 | |
| WO | WO-2015001041 A1 * | 1/2015 | ............. H04L 69/08 |

OTHER PUBLICATIONS

French Search Report and Written Opinion dated Jan. 18, 2019 for corresponding French Application No. 1855924, filed Jun. 29, 2018.
English translation of the Written Opinion dated Jan. 18, 2019 for corresponding French Application No. 1855924, filed Jun. 29, 2018.

* cited by examiner

*Primary Examiner* — Jared Fureman
*Assistant Examiner* — Joel Barnett
(74) *Attorney, Agent, or Firm* — David D. Brush; Westman, Champlin & Koehler, P.A.

(57) ABSTRACT

A system for controlling of at least one connected thing by using a switch capable of switching from an open position to a closed position and vice versa. The system includes a regulation device parallel-mounted with the switch in an electrical power supply circuit of the at least one connected thing. The regulation device includes: a module for detecting a change in position of the switch; and a communications module capable of transmitting information on the detected change in position to the at least one connected thing.

8 Claims, 6 Drawing Sheets

SYSTEM FOR THE CONTROL OF CONNECTED THINGS, CORRESPONDING METHOD OF CONTROL AND COMPUTER PROGRAM

1. FIELD OF THE DISCLOSURE

The field of the disclosure is that of connected things or connected objects, such as for example connected light-bulbs, connected temperature sensors, connected refrigerators or connected outlets.

The term "connected thing" is understood here and throughout the rest of this document to be a wireless connected electronic object sharing information with a computer, an electronic tablet, a mobile telephone or any other apparatus, for example an access gateway to a local-area communications network. More generally, a connected thing is a device of the real world (a watch, a light-bulb, a thermometer, a water-heater, etc.) capable of directly or indirectly exchanging information and data with the Internet.

More specifically, the disclosure relates to the control of such connected things, especially, but not exclusively, in the context of their domestic use, for example in a house.

2. PRIOR ART AND ITS DRAWBACKS

At present, connected things are no longer limited to watches, bracelets or glasses but are also investing the interior of our homes. Henceforth our houses will incorporate various connected things such as heating and/or air-conditioning devices, lighting installations, electrical outlets, or household appliances.

These connected things have the advantage of being remotely handled or managed through various control devices such as a smartphone or a tablet for example. Thus, a user, through a software application installed on his smartphone, can modify the light intensity in the room or the color of the light from the connected light-bulb fixed to the ceiling, without having to get up from his couch. Similarly, the user, from his workplace, can use his smartphone to turn on his heating equipment.

Novel connected things are coming onto the market every day but their incorporation into houses may raise practical problems for users.

The typical example is that of the connected light-bulb. This light-bulb can be managed for example through a smartphone via a wireless communications protocol (such as for example Bluetooth® or Wi-Fi®) that makes it possible to modify the color of the diffused light, modulate the light intensity or more simply command it to go on or off. It is simple to fit in. All that needs to be done is to fit the connected light-bulb into a ceiling light fixture or a lamp unit and then power it, if necessary, by actuating a switch electrically connected to the ceiling light fixture or to the lamp unit.

However, one of the drawbacks of this installation is that actuating the switch can prove to be incompatible with the remote operation of the connected light-bulb through a smartphone or tablet type control device. Indeed, if the user, when leaving his drawing room, turns the light off by flipping the associated switch into the open position, then he can no longer turn the light-bulb on by remote control through his smartphone so long as he has not made the associated switch flip over into the closed position to provide electrical power to the connected light-bulb.

The fact is that to be remotely operable, connected light-bulbs need to be always under voltage.

However, it often happens that the user, in the domestic context, traditionally uses the switch to turn off a connected light-bulb either by habit or as a reflex gesture or because he does not have his smartphone within reach and so it is simpler and faster for him to use the switch.

This therefore requires him, during subsequent use, to first of all put the connected light-bulb under voltage by flipping the switch into the closed position and then if necessary, manage the lighting of the light-bulb through his smartphone, entailing numerous, tedious operations.

It can therefore appear that the use of the switch, which is present by default in all electrical installations in homes, can prove to be cumbersome or even incompatible with the remote operation of connected things by smartphones or tablets. Indeed, the primary function of the switch, i.e. driving the on and off functions of the connected light-bulb, is henceforth useless since on the one hand the light-bulb must always be under voltage to be capable of being remotely managed through a control device and on the other hand it is impossible, using a remote-control unit, to turn on a connected light-bulb that has been previously turned off using a switch.

These same drawbacks are found when using any other type of connected thing whatsoever integrated into an electrical power supply circuit controlled by a switch.

To resolve these drawbacks, a simple solution could consist in eliminating all the switches of home electrical installations and in keeping all the connected things permanently under voltage so that controlling these things becomes strictly conditional on the use of a smartphone type remote control unit.

Although this approach is simple, it has several drawbacks.

First of all, not all the users in a home are equipped with smartphones or tablets: in particular, the users could be children who for example would no longer be able to turn off the light in a room, and this would be harmful to the environment and entail greater power consumption.

Again, getting rid of the switches would be a cumbersome operation making it necessary to call upon a professional electrician.

In addition, to date there is no standardized communications language common to all connected things present in the market. Thus, connected things have a wide diversity of communications languages that are often proprietary communications languages proper to the manufacturer of the connected thing.

The result of this is that, to be able to control a connected thing, for example by means of one's smartphone, this phone should embed as many applications as there are communications languages for these things and this may prove to be particularly complicated to manage when the number of connected things is greatly increased and this would require a large processing and storage capacity in the remote control equipment.

There is therefore a need for an improved technique for controlling connected things, especially connected things powered by an electrical power circuit controlled by a switch. In particular, there is need for such a technique that allows any connected object to be continuously and easily controlled by remote control equipment, regardless of the opening or closing position of the associated switch.

3. SUMMARY

One or more aspects of the present disclosure respond to this need by proposing a system for the control of at least one connected thing by means of a switch capable of switching from an open position to a closed position and vice versa.

According to an exemplary aspect, such a system of control comprises a regulation device parallel-mounted with the switch in an electrical power supply circuit of the connected thing or things and such a regulation device comprises a module for detecting a change in position of the switch and a communications module capable of transmitting information on the detected change in position to the connected thing or things.

Thus, an exemplary aspect of the disclosure relies on a wholly novel and inventive approach to the controlling of connected things powered by an electrical power supply circuit, for example within a home.

Indeed, an exemplary aspect of the disclosure proposes to very simply isolate the switch of the connected thing or things by mounting in parallel with the switch a regulation device in the electrical power circuit of this connected thing or things. Through this parallel connection, the connected thing or things remain always under voltage and is or are therefore always connected and therefore can be regulated remotely by a control unit which can be a smartphone or a tablet for example.

Advantageously, the regulation device comprises a detection module capable of detecting a change in position of the switch and a communications module capable of thereafter transmitting information related to this detected change in position to the connected thing or things.

Thus, an exemplary aspect of the disclosure significantly improves the ergonomy of use of the connected thing which may permanently be controlled, either through a remote-control unit or conventionally by use of a switch of the electrical installation.

The use of the switch as a reflex to turn off a connected light-bulb when leaving a room no longer poses a problem when the user later wishes again to turn it on with his smartphone because the regulation device according to one aspect of the disclosure makes it possible to keep it under voltage while at the same time transmitting a command to turn off the connected light-bulb.

According to a first characteristic, such a communications module is capable of receiving a command addressed to one or more connected things coming from a remote-control unit and transmitting the command to this connected thing or these things after translation if necessary, of the command into a communications language adapted to this connected thing or things.

Thus, the communications module of the regulation device is capable of operating or driving the connected thing not only through commands resulting from the change in position of the switch but also through commands received from a remote-control unit of the smartphone type.

In addition, such a communications module advantageously incorporates the different communications protocols proper to each of the connected things and can play the role of a translation gateway between the control languages of the different remote-control units and those of the connected thing or things.

This simplifies and therefore greatly lightens the task of installing applications into the remote control unit device into which it is henceforth sufficient to integrate an application compatible with the communications language of the regulation device, which has the responsibility for carrying out a translation, if necessary, of a command received from the smartphone into a command that can be understood by the connected thing.

In the event of a modification of the communications languages of the connected thing or things or the appearance of a new communications language, it is possible to carry out a fast updating of the software embedded in all the regulation devices of the house.

According to another characteristic, the communications module is also capable of transmitting the information on the detected change in position to at least one other connected thing.

Thus, the switch, initially intended to control one or more specific connected things, can be reprogrammed to control one or more other connected things.

Indeed, through its communications module, the regulation device is capable of transmitting the change in position of the switch to one or more connected things different from those initially planned.

Thus, the user can decide that the switch disposed at the entrance to his house will no longer be used to control the lighting of the entrance hall but rather the external porch lighting. We thus obtain great modularity and great flexibility of reconfiguration of the house electrical network without any intervention by a professional electrician.

Indeed, the switch is no longer intended to control one or more connected things localized in a particular part of the house but can be reprogrammed to regulate one or more connected things localized elsewhere in the house. It thus becomes very simple to change the layout in one's house and adapt the switch-based operation of the connected things to one's habits.

According to another aspect of the disclosure, such a communications module is also capable of transmitting the information on the detected change in position to a device for monitoring human activity which may, for example, be a local-area server or remote server accessible through a residential gateway.

Indeed, the information on the change in position of the switch, detected by the detection module of the regulation device, can advantageously be transmitted by the communications module to a "tracking" or monitoring server: the detection of the change in position of the switch indicates indeed a human presence in the house and furthermore makes it possible to locate this human presence with precision. This tracking server can be a local-area server or remote server accessible through a residential gateway which can be implemented in the context of an anti-intrusion monitoring system or a parental control system for example.

Thus, various items of data on the use of the connected things can be collected such as for example the type of connected thing used, the time and the hours of use or the location of the connected thing in the house. The collected data thus make it possible to define a profile of use of these connected things by one or more users, for example a user who is present at a given time in the house and to know if this presence is habitual and normal at such a time or not.

In the example of the connected light-bulbs, the communications module of the regulation device sends information to a device for tracking human activity on the lighting/extinguishing of one or more connected light-bulbs. It can therefore be known if someone is present in the house and, if so, where the person is—for example in the garage or in a bedroom. It is therefore possible, by combining data on the hour, amount of time and place of use of connected light-bulbs, not only to know who is present but also to anticipate the presence of one user in particular.

It can therefore be envisaged thereafter to program an alarm about an unusual use of a particular connected thing related to an unexpected presence in the house or else an alarm when it is forgotten to turn off this thing.

Advantageously, the collecting of this data on use of connected things makes it possible to propose to users a programming of the use of these things as a function of their habits and needs.

It is therefore possible for example to propose that the arrival of a user will be anticipated by turning on certain connected things in particular at a given hour.

According to another aspect, such a communications module is capable of transmitting information on the detected change in position to the connected thing or things through an access gateway to a local-area communications network, also called a residential gateway, to which the connected thing or things are connected.

Thus, in this variant, the communications module does not directly transmit the driving command (received from a remote regulation device or generated upon detection of a change in position of the switch) to the connected thing but transmits it to a residential home gateway of the local-area communications network to which the connected thing is connected. It is then the residential gateway that relays this command to the connected thing (for example using Wi-Fi 2.4).

According to yet another aspect, such a regulation device also comprises means for interrupting the electrical power supply circuit of the connected thing or things. These means are activated when the detection module detects a change in position of the switch to an open position and/or when the communications module receives a command for switching off the connected thing(s) coming from a remote-control unit.

Thus, an exemplary aspect of the disclosure advantageously prevents residual electricity consumption associated with the permanent powering of connected things. The regulation device can thus integrate a switch, disposed on the electrical power supply circuit of the connected thing, that can regulate the passage of current through the electrical power circuit for the connected thing or things. The switch of the regulation device can be open and interrupt the circulation of the electrical current towards the connected thing when the regulation device detects the fact that the user has switched the wall switch into the "OFF" position and/or when it receives a command from a remote control unit to turn the connected thing off.

Thus, through its means for interrupting the electrical power supply circuit of the connected thing or things, the regulation device optimizes the electrical consumption within the house.

An exemplary aspect of the disclosure also relates to a method for controlling at least one connected thing connected to an electrical power supply circuit on which there is disposed a switch capable of flipping from an open position to a closed position and vice versa. Such a method comprises:
- a step for permanently powering said at least one connected thing;
- a step for detecting a change in position of said switch; and
- a step for transmitting information on said detected change in position to said at least one connected thing.

An exemplary aspect of the disclosure also relates to a computer program product comprising program code instructions to implement the above-mentioned method of control when it is executed by a processor.

This method of control and this computer program have the same features and advantages in combination as those described here above with the system of control according to the different aspects of the disclosure.

4. LIST OF FIGURES

Other aims, features and advantages shall appear more clearly from the following description, given by way of a simple illustrative and non-exhaustive example, made with reference to the figures, of which.

5. DETAILED DESCRIPTION OF ILLUSTRATIVE ASPECTS OF THE DISCLOSURE

An exemplary principle of one or more aspects of the disclosure relies on the insertion, into the electrical power supply circuit of a connected thing, of a regulation device parallel-mounted with a control switch for connected things, making it possible not only to constantly keep the connected thing under voltage, whatever the position of the switch, but also to control the connected thing in order to manage its operation.

The insertion of such a regulation device enables a simple configuration of the electrical power circuit of one or more connected things by isolating them from the switch responsible for the opening and/or closing of the electrical power supply circuit.

Thus, the connected thing or things, such as for example the connected light-bulbs or the connected outlets can be driven by a remote-control unit but also by a classic switch. Here below, the term remote control unit designates the following elements alone or in combination:
- a smartphone TEL;
- an access gateway to a local-area communications network, also called a residential gateway;
- a manufacturer's gateway. The term "manufacturer's gateway" is understood to mean a communications gateway embedding a proprietary radio communications protocol for communications with a connected thing, which translates, into a communications language proper to the connected thing, a command coming from another device such as a smartphone and/or a residential gateway. This communications language is generally proper to the manufacturer of the connected thing.

Figure 1A:
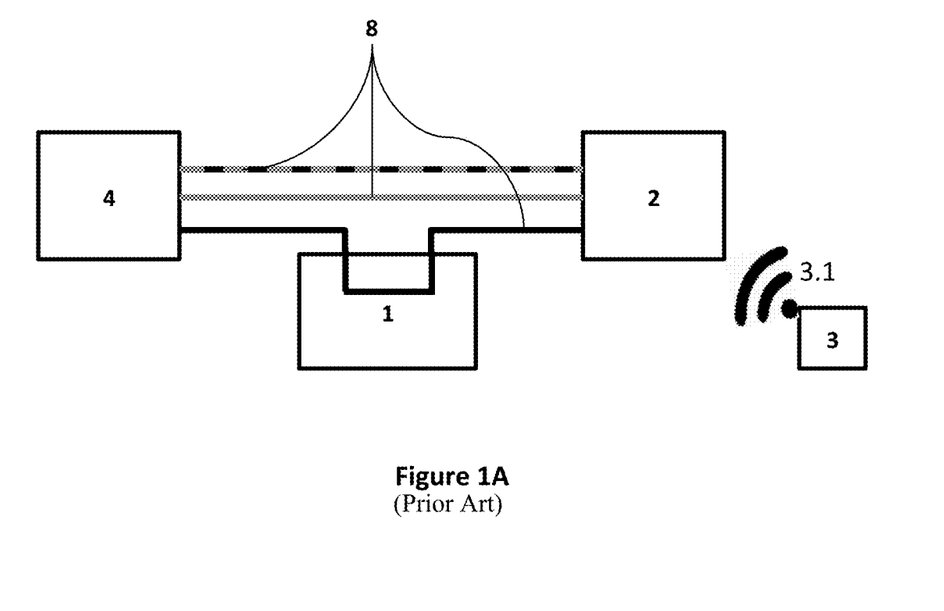
FIGS. 1A, 1B, 1C present different configurations of a home electrical installation of a connected thing that can be regulated by a remote-control unit, according to the prior art.
Figure 1B:
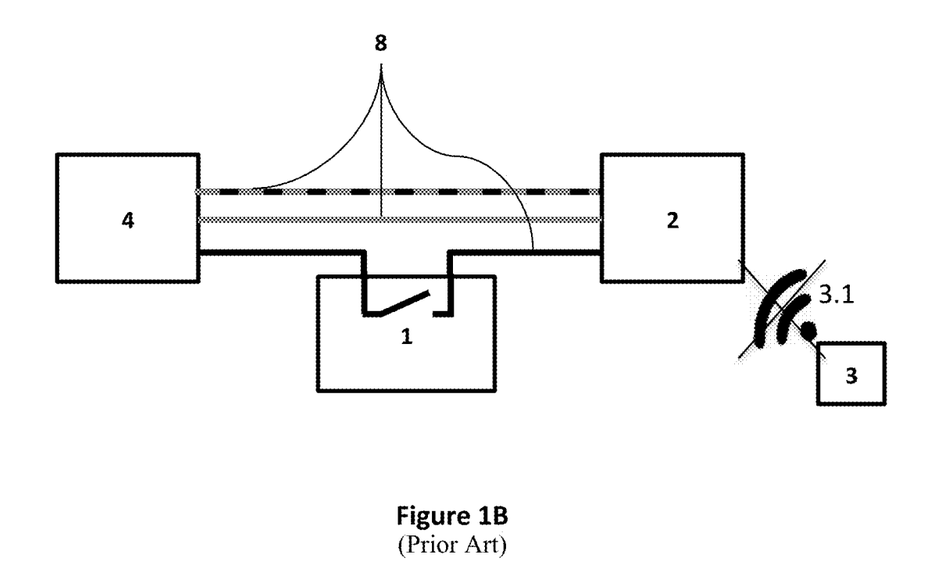
Figure 1C:
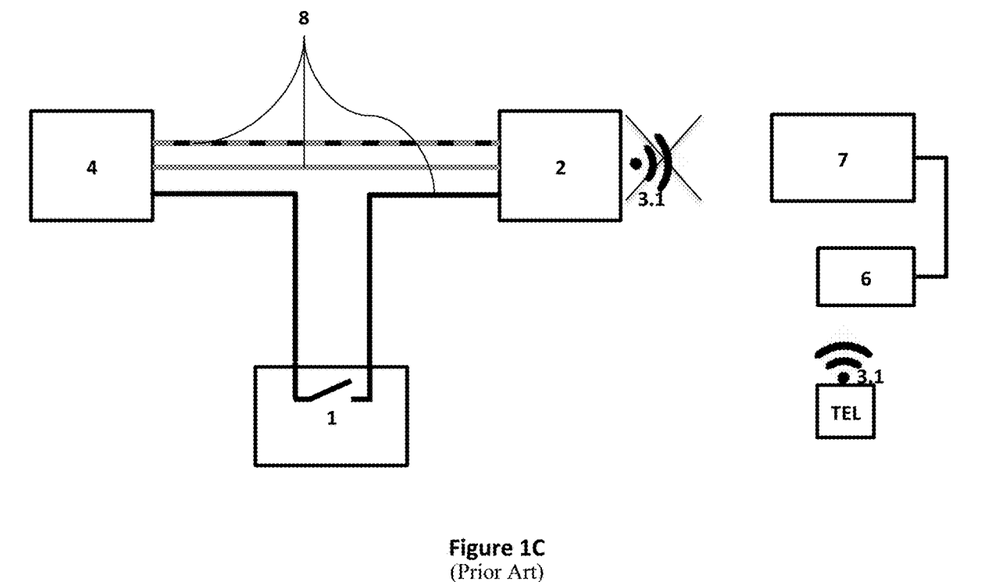

Referring here below to FIGS. 1A, 1B and 1C, examples are presented of the known general structure of a power supply circuit 8 of one or more connected things 2, such as for example a connected light-bulb of the LiFx® type, or again the Philips Hue® type, or connected plugs such as for example SmartPlug®, or again Wemo®. FIG. 1A shows one or more connected things 2 connected to the electrical panel 4 through an electrical power supply circuit 8. For the sake of simplification, only one connected thing 2 is illustrated in the figures here below. A switch 1, capable of passing from a closed position, illustrated in FIG. 1A, to an open position, illustrated in FIG. 1B and vice versa, controls the connected thing 2 by interrupting or allowing the passage of electrical current into the power supply circuit 8 of the connected thing. It will be noted that the switch 1 makes it possible to drive the on/off connection of connected thing but also for example in the case of a connected light-bulb to obtain variation in the color of the lighting or to modulate its light intensity.

When the switch 1 is in a closed position, as illustrated in FIG. 1A, the connected thing 2 is powered and can be driven more precisely through a remote-control unit 3, for example a smartphone or a tablet. This remote-control unit 3 drives the connected thing by transmitting a command 3.1 which can be conveyed by a wireless connection of the Wi-Fi®, Bluetooth® or again ZigBee® type, or again a wired connection of the powerline carrier (PLC) type. The command transmitted by the remote-control unit 3 to the connected thing 2 can relate for example to powering on and/or powering off or again to the implementing of different modes of use of the connected thing 2. Thus, in the example of a connected light-bulb, it is possible by means of one's smartphone 3 to remotely command the lighting and/or extinction of the light-bulb but also the changing of the color of the light-bulb or again the reducing or increasing of the light intensity of the light-bulb.

FIG. 1B illustrates a case where the switch 1 is open, interrupting the passage of electrical current into the electrical power supply circuit 8 of the connected thing 2. The connected thing 2 is no longer under voltage and therefore can no longer be managed by the remote-control unit 3 through a command 3.1. This situation poses a problem and lacks ergonomy for the user.

FIG. 1C illustrates a particular case in which the switch 1 is open, interrupting the passage of electrical current into the power supply circuit 8 of the connected thing 2. The connected thing 2 is no longer under voltage and therefore can no longer be driven by a remote-control unit comprising, in this example, a smartphone TEL, a residential gateway 6 and a manufacturer's gateway 7. The smartphone TEL sends out a command 3.1 intended for one or more connected things to the residential gateway 6 which receives and transmits this command to the manufacturer's gateway 7. In its turn, the manufacturer's gateway receives and transmits the command in translating it into a communications language proper to the connected thing 2. However, the connected thing 2 is no longer under voltage and it therefore cannot execute the command.

Thus, according to the prior-art solution, to be able to use the connected thing 2, it is necessary for the switch to be always in a closed position.

Figure 2:
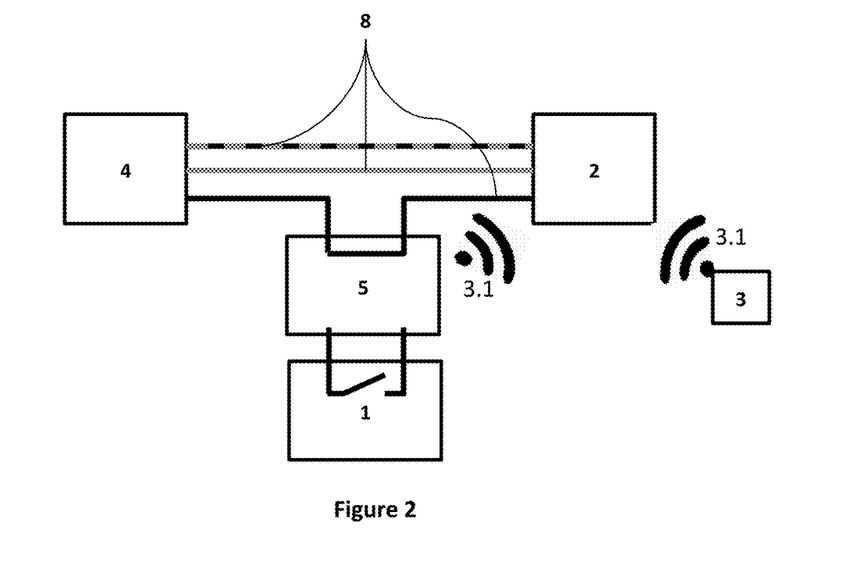
FIG. 2 illustrates a hardware structure of the control system for one or more connected things powered by an electrical circuit according to one aspect of the disclosure.

FIG. 2 presents a control system according to one aspect of the disclosure comprising a switch 1 and a regulation device 5. The regulation device 5 is mounted in parallel with the switch 1 in the electrical power supply circuit 8 of the connected thing 2. The change in ON/OFF position of the switch 1 no longer acts directly on the electrical power supply of the connected thing 2. The parallel mounting of the regulation device 5 and the switch 1 in the electrical power supply circuit 8 enables the connected thing 2 to be always under voltage because the electrical power supply circuit 8 remains permanently closed.

As shall be presented here below with reference to FIG. 7, the regulation device 5 comprises a detection module DET capable of detecting changes in position, whether open or closed, of the switch 1. The regulation device also comprises a communications module COM that sends information to the connected thing 2 or a remote unit (for example the remote-control unit for the connected thing) on a detected change in position of the switch 1. In other words, the communications module COM of the regulation device 5 sends out an on/off command to the connected thing depending on the position, whether closed or open, of the switch 1.

Thus, when the switch 1 passes from a closed position to an open position, the detection module DET detects this change in position and the communications module COM then transmits information to the connected thing 2 on this change in position in the form of a command 3.1. In this example, the passage of the switch 1 to an open position means that the user wishes to turn the connected thing 2 off. The communications module COM therefore sends out a command 3.1 for turning off the connected thing 2. Since the connected thing 2 is always under voltage, it remains operable by a remote-control unit 3.

The connected thing 2 can then be turned on by a command sent by the remote-control unit 3 but also, if the detection module DET detects the passage in the switch 1 from an open to a closed position, by the sending of an ON command by the communications module COM.

Figure 3:
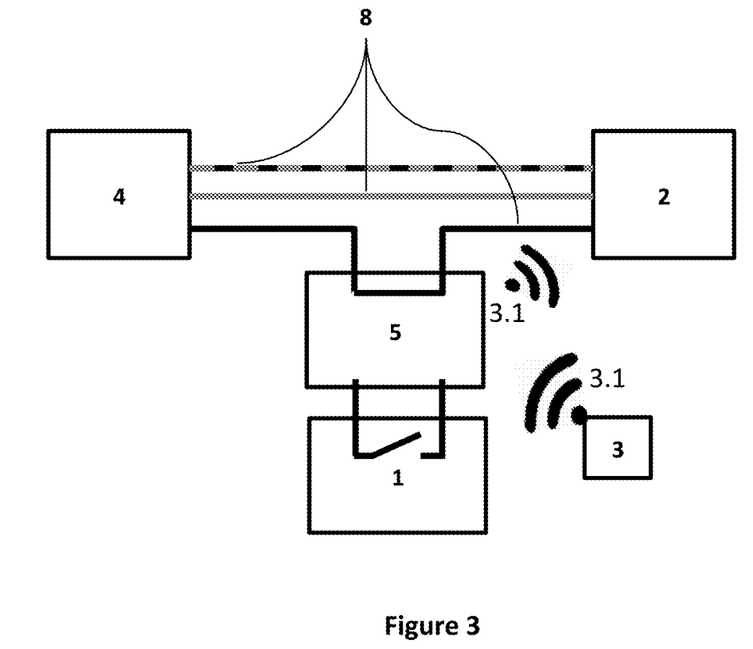
FIG. 3 presents a hardware structure of the control system for one or more connected things powered by an electrical circuit according to another aspect of the disclosure.

Referring to FIG. 3, we present one particular aspect of the disclosure in which the remote control unit 3 no longer transmits its commands directly to the connected thing 2 but indirectly through the communications module COM of the regulation device 5 which receives and then retransmits to the connected thing 2 the command that is intended for it. Before retransmission, the regulation device can also translate the command received from the device 3 into a language that can be interpreted by the connected thing 2.

Indeed, the communications module COM of the regulation device 5 incorporates the different communication languages of the different connected things 2 existing in the market. This simplifies the processing by the remote-control unit 3, which no longer needs to incorporate the different existing communications languages apart from the one that enables dialog with the regulation device 5.

The regulation device 5 therefore acts as an intermediary between, on the one hand, a remote-control unit 3 via its communications module COM and/or the switch 1 via its detection module DET and, on the other hand, the connected thing 2.

According to another aspect of the disclosure, the communications module COM of the regulation device 5 is also capable of sending a local or remote server, accessible through a residential gateway 6, data linked to information on the detected change in position, i.e. related to the use of one or more connected things 2 via the control of the switch 1.

Thus, the collecting of this data on the use of connected things 2 makes it possible to propose to users a programming of the use of these objects according to their habit and their need, but also makes it possible, through an alert sent for example to the user's smartphone, to warn the user about the unusual presence of someone in the house. For example, if the data collected show that a connected thing, typically a connected light-bulb situated in the garage, usually lights up after 7 pm, then it can be deduced from this that a user in particular has just returned home. In the event of an unusual presence, a warning can then be set up in case another connected thing, for example another light-bulb situated this time in the drawing room, is for example lit at this time instead of the light-bulb in the garage.

Figure 4:
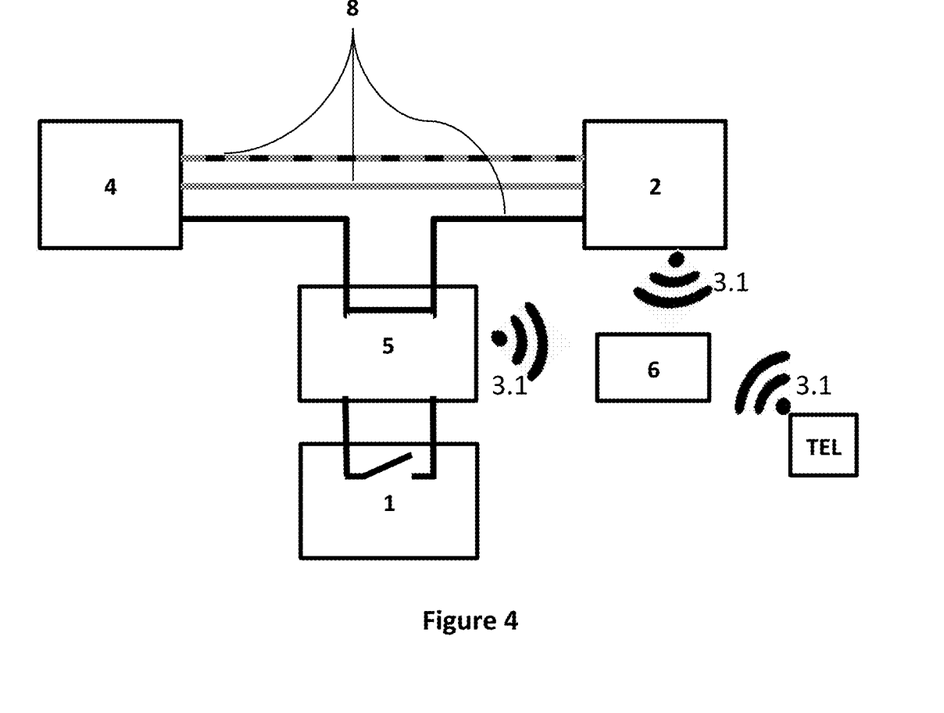
FIG. 4 illustrates, in one particular aspect of the disclosure, a hardware structure of the control system for one or more connected things powered by an electrical circuit and connected through an access gateway to a local-area communications network.

Referring to FIG. 4, we show a particular aspect of the disclosure in which the driving of one or more connected things 2 is carried out through a residential gateway 6. A connected thing 2 is connected through an access gateway to a local-area communications network or residential gateway 6. The connected thing 2 is always under voltage through the regulation device 5 parallel-connected with the switch 1. When the detection module DET of the regulation device 5 detects a change in position of the switch 1, the communications module COM of the regulation device 5 transmits information on the detected change to the connected thing 2 through the residential gateway 6. The residential gateway 6 receives and also transmits to the connected thing 2 a command possibly coming from another device such as for example a smartphone TEL.

The connected thing 2, for example a light-bulb, is then connected to the home communications network through a residential gateway 6 constituting a point of access to the network. The connected light-bulb 2 is still under voltage.

The regulation device 5 sends out the same frames as the smartphone 3 to turn the light-bulb 2 on and off.

Figure 5A:
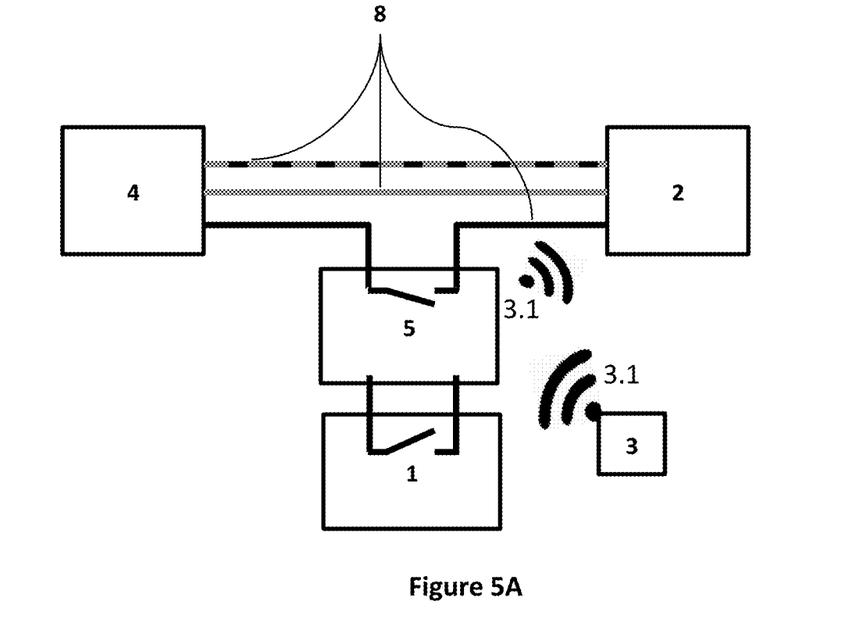
FIGS. 5A, 5B, 5C present different particular examples of FIG. 3, in which the regulation device integrates switching for the electrical power supply circuit of the connected thing.
Figure 5B:
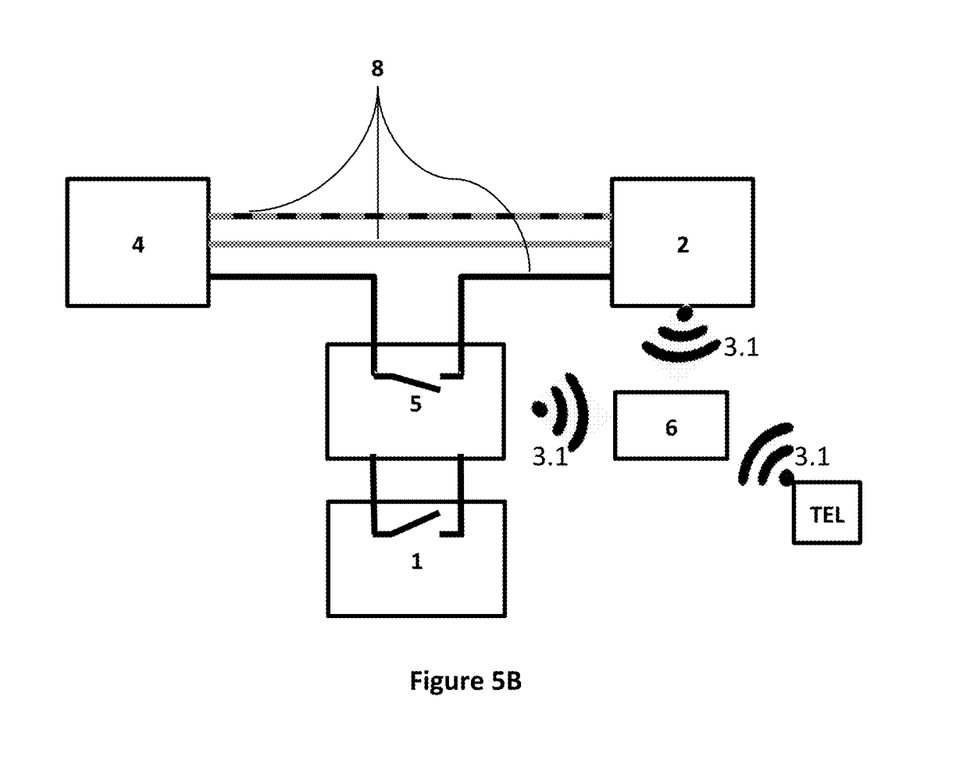
Figure 5C:
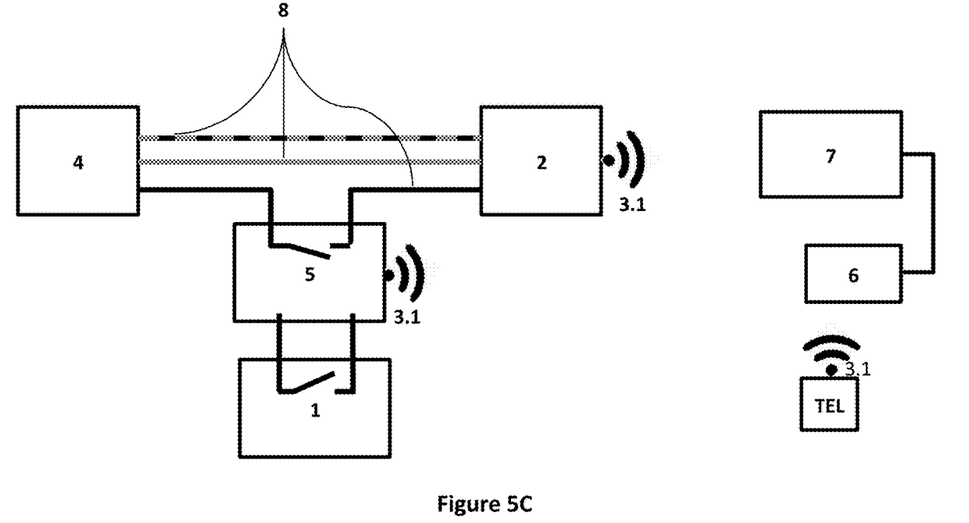

FIGS. 5A, 5B and 5C present particular examples of FIG. 3 in which the regulation device 5 includes an interrupting circuit INT for the electrical power supply circuit 8 of the connected thing or things 2. In the example presented in FIG. 5A, the communications module COM of the regulation device 5 receives and sends out a command 3.1 intended for one or more connected things 2 of a remote-control unit 3. The change in position of the switch 1 can also drive the connected things 2 through the presence of the detection module DET and communications module COM of the regulation device 5. As described here above with reference to FIG. 3, the regulation device 5 plays a role of intermediary between these different elements. The regulation device 5 then, through its interrupting circuit INT, can cut off the electrical power supply circuit 8 when the detection module DET of the regulation device 5 detects a change in position of the switch 1 to an open position and/or when the communications module COM of the regulation device 5 receives a command for turning off the connected thing or things coming from the remote control unit 3.

FIG. 5B presents another particular example of FIG. 3 in which the communications module COM of the regulation device 5 receives a command intended for the connected thing or things 2 by means of a smartphone TEL. The smartphone TEL sends a residential gateway 6 the command intended for one or more connected things 2. This residential gateway 6 receives and forwards this command to the communications module COM of the regulation device 5, and then forwards it to the connected thing or things 2. As above, the interrupting circuit INT of the regulation device 5 can cut off the electrical power supply circuit 8 from the connected thing or things 2. In this example, the connected thing 2, for example a light-bulb, is connected to the home communications network, whose residential gateway is the access point. The local-area communications network is configured to reroute calls to the connected thing 2 to the regulation device 5. This regulation device 5 acts as a proxy and can cut off the power supply to the light-bulb 2 when it is extinguished. It can also power on the light-bulb 2 when it detects an ON request.

FIG. 5C presents yet another particular example of FIG. 3 in which the communications module COM of the regulation device 5 receives a command intended for the connected thing or things 2 through a smartphone TEL. The smartphone TEL sends a residential gateway 6 the command intended for one or more connected things 2. This residential gateway 6 receives and sends out this command to a manufacturer's gateway 7. This manufacturer's gateway 7 receives and then transmits this command to the communications module COM of the regulation device 5 and then transmits it to the connected thing or things 2. As above, the interrupting circuit INT of the regulation device 5 can cut off the electrical power supply circuit 8 of the connected thing or things 2.

The examples s described here above have the advantage of enabling the electrical power supply circuit 8 of one or more connected things to be switched off when the user wishes to turn this connected thing or things off, and therefore optimizes electrical consumption in the house. This switching off operation enables the user to avoid consuming more electricity than in a classic system without connected things and to consume less power than when using a connected thing controlled in a classical way with a switch, which must always be in the closed position.

Figure 6:
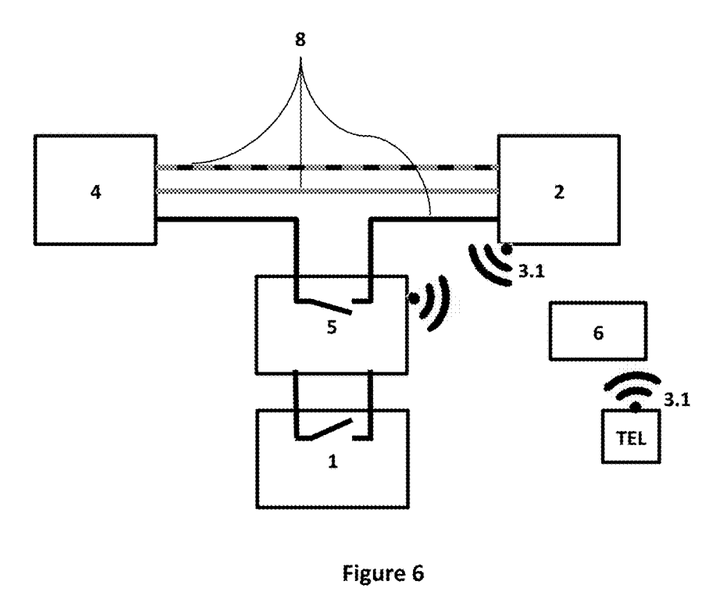
FIG. 6 presents a particular example of FIG. 5B in which the connected thing has access to the local-area communications network through the regulation device.

FIG. 6 is a particular example of FIG. 5B in which the regulation device 5 has a Wi-Fi® access point to a local-area communications network to which there is connected the connected thing 2. The regulation device 5 acts as a proxy and can cut off the power to the light-bulb 2 when it is turned off. It can also put the light-bulb 2 under voltage when it perceives a switch-on request.

Indeed, the regulation device 5 continues to act as an intermediary through its detection module DET and communications module COM. The interrupting circuit INT of the regulation device 5 can cut off the power supply to the connected thing or things 2 when the communications module COM receives a switch-off command from remote control units (in this case a smartphone TEL and a residential gateway 6) or else when the detection module DET detects the passage from a closed position to an open position of switch 1. The interrupting circuit INT of the regulation device 5 can also put the connected thing or things 2 under voltage when the communications module COM receives a command for switching on the remote control units TEL 6 or else when the detection module DET detects the passage of the switch 1 from an open position to a closed position.

Figure 7:
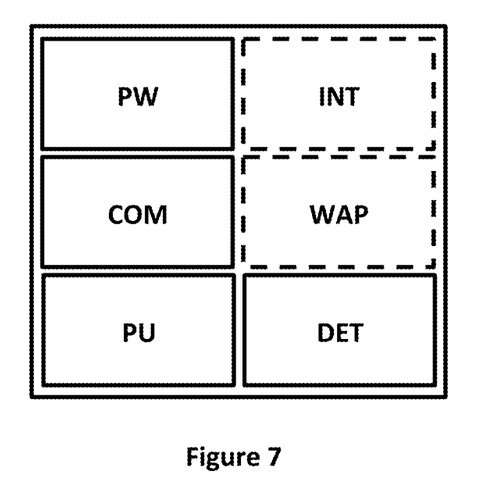
FIG. 7 proposes a simplified block diagram of the hardware structure of the regulation device according to one aspect of the disclosure.

Referring now to FIG. 7, we present an example of a hardware structure of the regulation device 5. The regulation device 5 is powered by a power supply unit PW and comprises memories associated with a microprocessor PU which executes and processes the instructions given to the regulation device 5. The memories can be of the ROM (read-only memory) or RAM (random-access memory) type or again Flash memory type. The processor PU is driven by a computer program stored in a read-only memory (for example a ROM or a hard disk drive). At initialization, the code instructions of the computer program are for example loaded into the random-access memory and then executed by the processor PU. The processor PU manages the detection of a change in position of the switch by the detection module DET as well as the management of the reception and transmission of commands by the communications module COM. The communications module COM is capable of receiving, from the remote-control units 3, a command intended for one or more connected things and/or transmitting this command and/or information on a change in position of the switch 1 to the connected thing or things concerned.

This transmission can be carried out by a direct communication 3.1 with the connected thing or things 2 and/or through a residential gateway 5. In order that the communications module COM may transmit information on a detected change in position, the regulation device 5 also comprises a detection module DET for detecting a change in position of the switch 1. In other words, the detection module DET is capable of detecting whether the switch 1 has passed from an open position to a closed position.

When the regulation device 5 acts as an intermediary, i.e. when the communications module COM receives and transmits to one or more connected things the command that is sent to it or to them by the remote control unit 3 as illustrated in FIGS. 5A, 5B, 5C and 6, the regulation device also includes interrupting circuit INT for the electrical power supply circuit 8.

The regulation device 5 can also include, in this case of the example of FIG. 6, a module for access to a local-area communications network WAP (Wi-Fi® hotspot) enabling the connected thing or things 2 to have access to this communications network.

FIG. 7 illustrates only one particular way, among several possible ways, of making the regulation device 5 so that it will carry out the steps of the control method according to the disclosure in any one of the different aspects or in a combination of these aspects. Indeed, these steps can be carried out equally well on a reprogrammable computation machine (a PC computer, a DSP processor or a microcontroller) executing a program comprising a sequence of instructions or a dedicated computation machine (for example a set of logic gates such as an FPGA or an ASIC or any other hardware module).

Although the present disclosure has been described with reference to one or more examples, workers skilled in the art will recognize that changes may be made in form and detail without departing from the scope of the disclosure and/or the appended claims.

The invention claimed is:

1. A system for controlling at least one connected thing by using a switch capable of switching from an open position to a closed position and vice versa, wherein the system comprises:
   a regulation device parallel-mounted with said switch in an electrical power supply circuit of said at least one connected thing, wherein said regulation device comprises:
   a module configured to detect a change in position of said switch; and
   a communications module configured to transmit information on the detected change in position to said at least one connected thing, wherein said communications module is configured to receive a command addressed to said at least one connected thing coming from a remote control unit and transmitting said command to said at least one connected thing after translation into a communications language adapted to said at least one connected thing.

2. The system according to claim 1, wherein said communications module is also configured to transmit said information on said detected change in position to at least one other connected thing.

3. The system according to claim 1, wherein said communications module is also configured to transmit said information on said detected change in position to a device for monitoring human activity.

4. The system according to claim 1, wherein said communications module is configured to transmit said information on said detected change in position to said at least one connected thing through an access gateway to a local-area communications network to which said at least one connected thing is connected.

5. The system of control according to claim 1, wherein said regulation device also comprises an interrupting circuit for interrupting said electrical power supply circuit of said at least one connected thing when said detection module detects a change in position of said switch to an open position.

6. The system according to claim 2, wherein said regulation device also comprises an interrupting circuit for interrupting said electrical power supply circuit of said at least one connected thing activated when said communications module receives a command for switching off said at least one connected thing coming from said remote control unit.

7. A method for controlling at least one connected thing connected to an electrical power supply circuit on which there is disposed a switch capable of switching from an open position to a closed position and vice versa, wherein the method comprises the following acts:
   permanently powering said at least one connected thing;
   detecting a change in position of said switch by a regulation device parallel-mounted with said switch in an electrical power supply circuit of said at least one connected thing;
   transmitting information from the regulation device on said detected change in position to said at least one connected thing; and
   receiving by the regulation device a command addressed to said at least one connected thing coming from a remote-control unit and transmitting said command to said at least one connected thing after translation of the command into a communications language adapted to said at least one connected thing.

8. A non-transitory computer-readable medium comprising a computer program product stored thereon comprising program code instructions to implement a method of controlling when the instructions are executed by a processor of a regulation device, wherein the instructions configure the regulation device to:
   control at least one connected thing permanently connected to an electrical power supply circuit on which there is disposed a switch capable of switching from an open position to a closed position and vice versa, wherein the method comprises the following acts:
   detecting a change in position of said switch by a regulation device parallel-mounted with said switch in an electrical power supply circuit of said at least one connected thing;
   transmitting information from the regulation device on said detected change in position to said at least one connected thing; and
   receiving by the regulation device a command addressed to said at least one connected thing coming from a remote-control unit and transmitting said command to said at least one connected thing after translation of the command into a communications language adapted to said at least one connected thing.

* * * * *